(12) United States Patent
Ito et al.

(10) Patent No.: US 10,518,807 B2
(45) Date of Patent: Dec. 31, 2019

(54) STEERING DISPLAY DEVICE OF WORK VEHICLE AND WORK VEHICLE

(71) Applicant: Mitsubishi Logisnext Co., Ltd., Kyoto (JP)

(72) Inventors: Takayuki Ito, Kyoto (JP); Ichiro Ohashi, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 0 days.

(21) Appl. No.: 15/949,449

(22) Filed: Apr. 10, 2018

(65) Prior Publication Data
US 2018/0297637 A1 Oct. 18, 2018

(30) Foreign Application Priority Data

Apr. 13, 2017 (JP) ................................ 2017-080030

(51) Int. Cl.
*B62D 15/02* (2006.01)
*B60K 35/00* (2006.01)

(52) U.S. Cl.
CPC ............ *B62D 15/029* (2013.01); *B60K 35/00* (2013.01); *B62D 15/024* (2013.01)

(58) Field of Classification Search
CPC ..... B62D 15/029; B62D 15/024; B60K 35/00
See application file for complete search history.

(56) References Cited

U.S. PATENT DOCUMENTS

2011/0066329 A1* 3/2011 Wakayama ........ B62D 15/0275
701/42
2011/0095910 A1* 4/2011 Takano ..................... B60R 1/00
340/932.2

FOREIGN PATENT DOCUMENTS

| JP | 05-075066 U | 10/1993 |
| JP | 10-218007 A | 8/1998 |
| JP | 2003-034496 A | 2/2003 |
| JP | 2004-277149 A | 10/2004 |
| JP | 2006-298586 A | 11/2006 |
| JP | 2007-062706 A | 3/2007 |
| JP | 2016-143399 A | 8/2016 |
| JP | 2017-074825 A | 4/2017 |

OTHER PUBLICATIONS

Extended European Search Report for European Application No. 18166895.5, dated Jul. 10, 2018.
Examination Report for European Application No. 18166895.5, dated Aug. 9, 2019.

* cited by examiner

*Primary Examiner* — Grace Q Li

(57) ABSTRACT

A steering display device of a work vehicle visually displaying a steering state of control wheels of the work vehicle, includes a display and an image generation unit. The display displays a rectangular frame representing a vehicle width of the work vehicle and a pointer representing a state of a steering of the control wheels as graphic information, and the image generation unit rotates the pointer about a rotation axis of the pointer and widens or narrows the rectangular frame based on the steering of the control wheels. The image generation unit generates the pointer and the rectangular frame in a manner such that when a steering angle of the control wheels exceeds a predetermined value, part of the pointer protrudes from the rectangular frame.

8 Claims, 15 Drawing Sheets

FIG. 6A  FIG. 6B  FIG. 6C
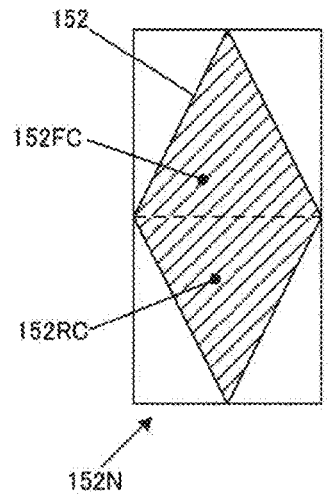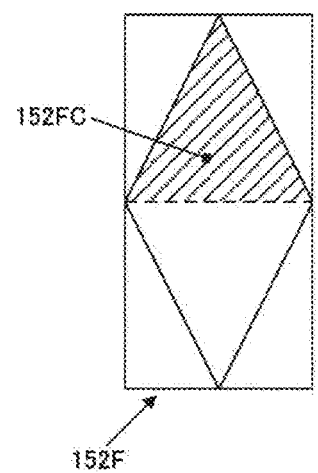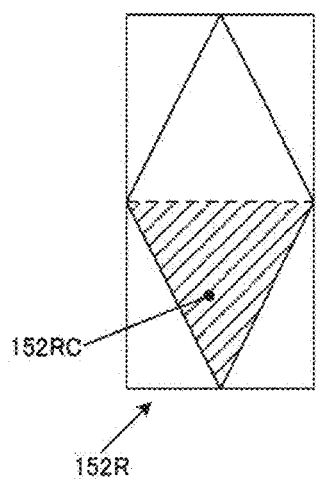
FIG. 6D
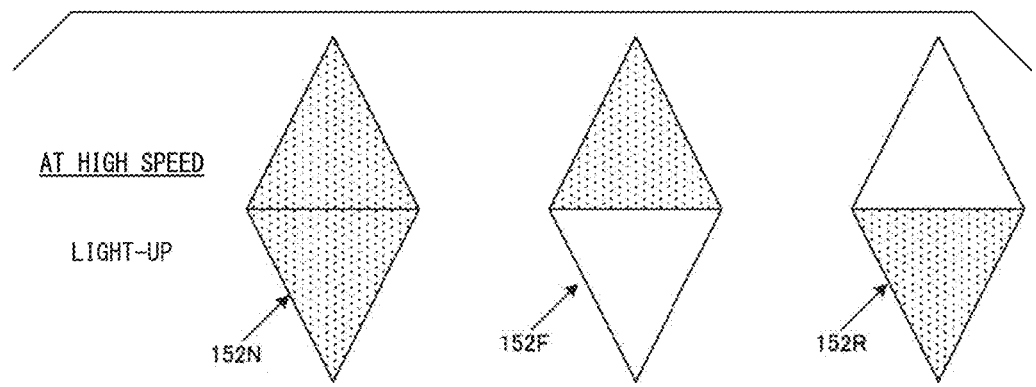
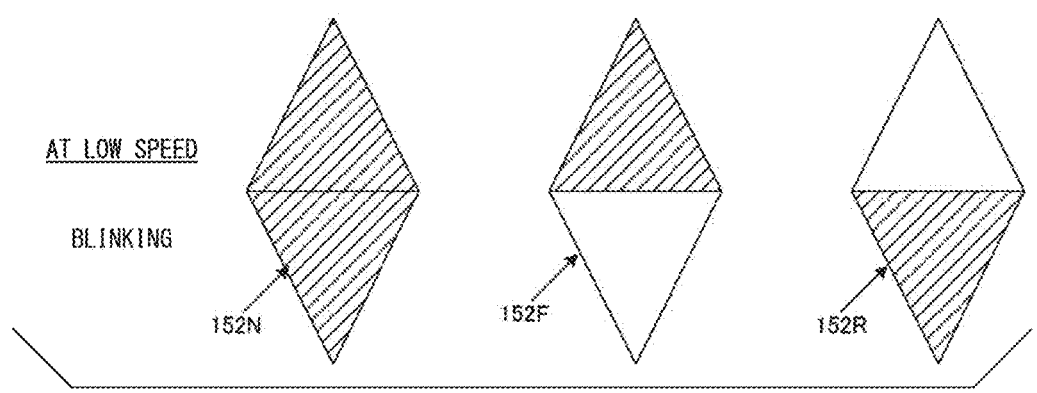

STEERING DISPLAY DEVICE OF WORK VEHICLE AND WORK VEHICLE

FIELD

The present disclosure relates to a steering display device that is configured to display a state of a tire of a work vehicle, such as a forklift, is protruded from a vehicle width of a vehicle main body, and the work vehicle provided therewith.

BACKGROUND

As a conventional technique for displaying information relating to steering the steered wheels/tires (hereinafter referred to as the "control wheels") of the work vehicle (such as a forklift), a device as described in Patent Document 1 is known. The device described in this document displays a vehicle speed when the vehicle speed is a reference vehicle speed or more, and displays a direction of the control wheels when the vehicle speed is less than the reference vehicle speed.

Japanese unexamined patent application, first publication No. 2006-298586

SUMMARY

However, since the conventional technique only displays a steering direction of the control wheels, it is not sufficient as steering information of the control wheels provided to a driver in relation to the driving situation of a vehicle.

A first aspect provides a steering display device of a work vehicle visually displaying a steering state of control wheels of the work vehicle, comprising: a display that is configured to display a vehicle width indicator representing a vehicle width of the work vehicle, and a control wheel indicator representing a state of steering of the control wheels as graphic information; and an image generation unit that is configured to rotate the control wheel indicator about a rotation axis of the control wheel indicator and is configured to widen or narrow the vehicle width indicator based on the steering of the control wheels. The image generation unit is configured to generate the control wheel indicator and the vehicle width indicator in a manner such that when a steering angle of the control wheels exceeds a predetermined value, part of the control wheel indicator protrudes from the vehicle width indicator.

A second aspect provides the steering display device according to the first aspect, and the image generation unit is configured to generate the control wheel indicator and the vehicle width indicator in a manner such that the control wheel indicator is located at an inside of the vehicle width indicator until a first steering angle in which the control wheels starts to protrude from a vehicle body and part of the control wheel indicator portion is located at an outside of the vehicle width indicator when the first steering angle is exceeded.

A third aspect provides the steering display device according to the first aspect or the second aspect, the rotation axis of the control wheel indicator is set at an inside of the vehicle width indicator, and a vehicle width of the vehicle width indicator when the control wheels have been steered is set to be wider than the vehicle width when the control wheels are in a neutral state.

A fourth aspect provides the steering display device according to the first aspect to the third aspect, and the image generation unit is configured to generate the vehicle width indicator in a manner such that the vehicle width of the vehicle width indicator is varied based on the steering angle, and when the steering angle is large, the vehicle width is displayed larger than when the steering angle is small.

A fifth aspect provides the steering display device according to the first aspect to the fourth aspect, and the image generation unit is configured to generate the vehicle width indicator and the control wheel indicator in a manner such that: the control wheel indicator is displayed within the vehicle width of the vehicle width indicator until the steering angle reaches the first steering angle; at least one of an outer tire and an inner tire protrudes from the vehicle width when reached a second steering angle; and both of the outer tire and the inner tire protrude from the vehicle width when reached a third steering angle.

A sixth aspect provides the steering display device according to the first aspect to the fifth aspect, and the image generation unit is configured to generate the vehicle width indicator in a manner such that a distance between the rotation axis and a vehicle width segment at the outer tire side is widened in a case where a distance between a pair of line segments facing each other in a vehicle width direction of the vehicle width indicator and the rotation axis of the control wheel indicator is widened.

A seventh aspect provides the steering display device according to the first aspect to the sixth aspect, and the image generation unit is configured to generate the control wheel indicator based on forward-rearward movement information in a manner such that a vehicle forward-rearward movement information is displayed using the control wheel indicator.

A eighth aspect provides the steering display device according to the first aspect to the seventh aspect, and the image generation unit is configured to generate the control wheel indicator based on a vehicle speed in a manner such that a vehicle speed information is displayed using the control wheel indicator.

A ninth aspect provides a work vehicle including: a work vehicle body having control wheels steered by steering of a steering operation member, wherein at least one of an inner tire and an outer tire of the control wheels is configured to protrude from the vehicle body by the steering, and a steering display device that is configured to visually display the steering state of the control wheels. The steering display device comprises: a display that is configured to display a vehicle width indicator representing a vehicle width of the work vehicle and the control wheel indicator representing a steering state of the control wheels as graphic information, and an image generation unit that is configured to generate the control wheel indicator and the vehicle width indicator as graphic information in a manner such that the control wheel indicator is rotated based on the steering angle of the control wheel and part of the control wheel indicator protrudes from the vehicle width indicator when the steering angle exceeds the predetermined value by corresponding to the steering angle in which the at least one of inner tire and the outer tire protrudes from the vehicle body.

A tenth aspect provides a steering display device of a work vehicle, the steering display device visually displaying a steering state of control wheels of the work vehicle by using a steering icon, including: an input unit that is configured to enter a steering angle information of the control wheel, a forward-rearward movement information of the work vehicle, and a vehicle speed information of the work vehicle, and an image generation unit that is configured to generate an icon as one steering icon from any one combination selected from a first combination, a second combination, and the third combination. The first combination represents a control wheel indicator showing the steering state of the control wheels and a forward-rearward movement indicator showing a forward-rearward movement information of the work vehicle, the second combination represents the control wheel indicator showing the steering state of the control wheels and a vehicle speed indication showing the vehicle speed information of the work vehicle, and the third combination represents the control wheel indicator showing the steering state of the control wheels, the forward-rearward movement indicator showing the forward-rearward movement information of the work vehicle, and the vehicle speed indication showing the vehicle speed information of the work vehicle.

An eleventh aspect provides the steering display device according to the tenth aspect, the steering icon includes a front indicator and a rear indicator that respectively represent a forward direction and a rearward direction of the work vehicle, and the image generation unit of the icon is configured to generate the steering icon based on the entered information from the input unit in a manner such that the front indicator is emphatically displayed when the work vehicle moves forward, the rear indicator is emphatically displayed when the work vehicle moves rearward, and the front indicator and the rear indicator are switched and displayed in the indication pattern in which the vehicle speed of the work vehicle is at low speed and in the indication pattern in which the vehicle speed of the work vehicle is at high speed.

According to the present disclosure, when steering the work vehicle in narrow premises, it is possible to visually and accurately display a steering state including control wheels, or the like, protruding from a lateral side of the vehicle.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 6A is a diagram illustrating the steering information indication icon in a neutral state of the vehicle.

FIG. 6B is a diagram illustrating the steering information indication icon in a forward movement state of the vehicle.

FIG. 6C is a diagram illustrating the steering information indication icon in a rearward movement state of the vehicle.

FIG. 6D is a diagram illustrating the respective steering information indication icon in the neutral state, the forward movement state, and the rearward movement state of the vehicle at high speed and low speed.

DETAILED DESCRIPTION

Hereinafter, embodiments will be described with reference to the drawings.

Overall Structure

Figure 1:
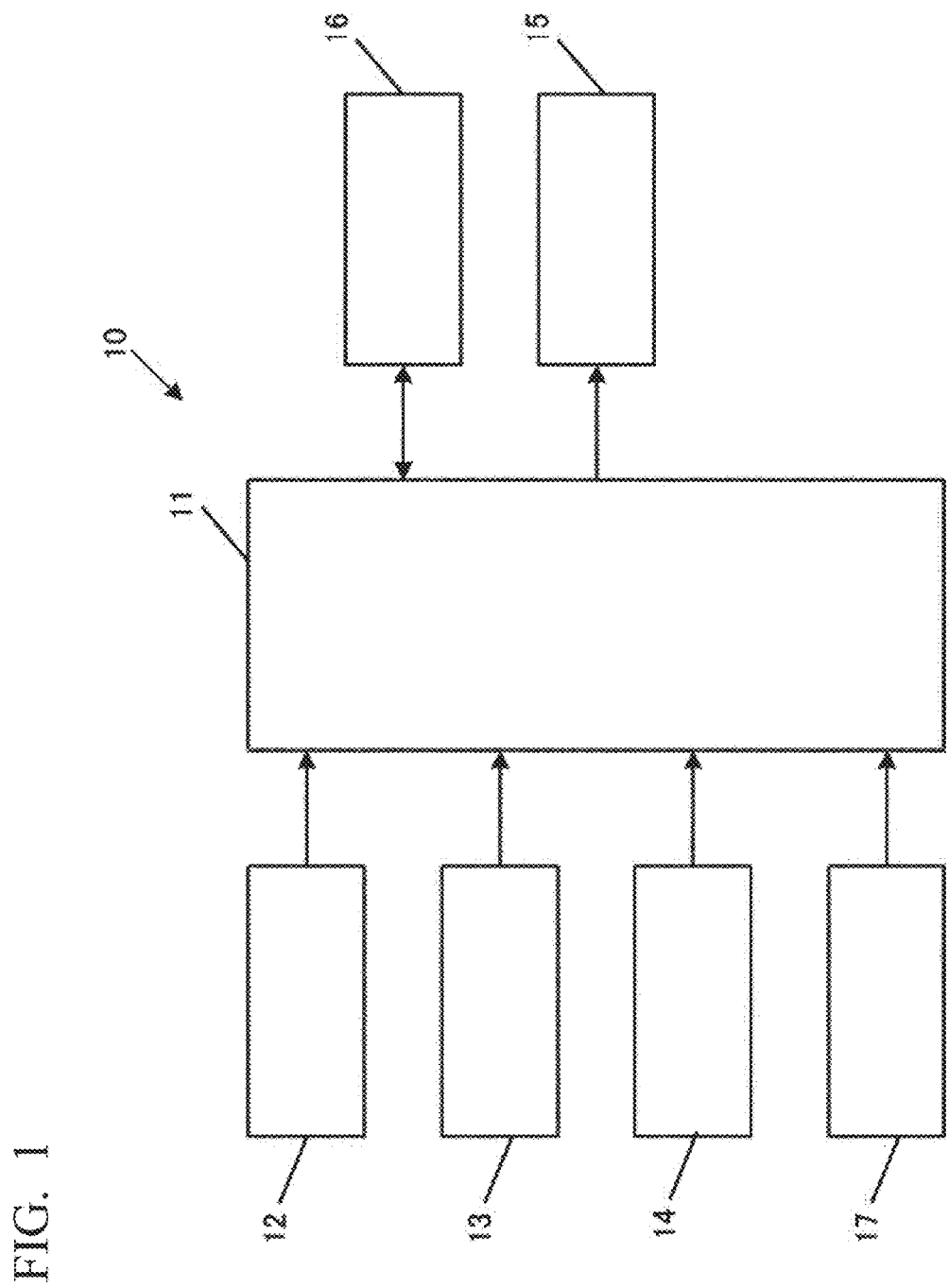
FIG. 1 is a block diagram schematically illustrating a tire steering angle display device of an embodiment.

FIG. 1 is a block diagram for explaining an embodiment in which a steering display device of a work vehicle is mounted on a forklift. Hereinafter, the device of the embodiment is referred to a tire steering angle display device. The forklift of the embodiment includes: a vehicle main body (a vehicle body) equipped with engine and electric device; tires (control wheels) including inner tires and outer tires turning a vehicle to the left and right by an operation of a steering wheel by an operator; and the tire steering angle display device.

In the present specification, an operation of a steering wheel is referred to as steering of the vehicle, and turning of tires by steering of the steering wheel is referred to as steering of the tires. Therefore, a detector that detects a rotation amount of the tires is referred to as a steering angle detector. Also, a steering amount is a physical quantity including a rotational direction (a steering direction) of the tires with a center line in a vehicle forward direction as a reference (0°) and a steering angle.

Tire Steering Angle Display Device

In FIG. 1, the tire steering angle display device 10 includes a controller 11, a forward-rearward movement detector 12 to detect an operation state of a forward-rearward instruction operating member, for example, a forward-rearward lever (a F/R lever), a vehicle speed detector 13 that detects a vehicle speed, a steering angle detector 14 that detects a rotation amount (including the steering direction and the steering amount) of the tires by a steering operation member, for example, the steering wheel, a display 15 that displays vehicle information including information related to the vehicle speed and steering, and an image generation unit 16 that generates an image displaying on the display 15. The steering angle detector 14 is, for example, an angle sensor. Also, the tire steering angle display device 10 further includes detectors 17 other than the above detectors such as a fuel level sensor in which the measurement value thereof is displayed on a fuel indicator 15*d*, a water temperature sensor in which the measurement value thereof is displayed on a water temperature indicator 15*e*, and a torque converter oil temperature sensor in which the measurement value thereof is displayed on a torque converter oil temperature indicator 15*f*.

Although not shown, the forklift includes: a travel command operating member such as an accelerator pedal; a traveling drive device such as an engine or an electric motor that outputs traveling driving force based on the travel command; a braking member, such as the brake pedal for braking the forklift; a braking force generating device for obtaining a braking force based on a braking command from the braking member; a cargo handling command member such as a cargo handling lever; a lifting and lowering device that ascends and descends a fork based on a cargo handling command; a tilting command member, such as a tilt lever; a tilting device for tilting the fork based on the tilting command; and the like.

Figure 2:
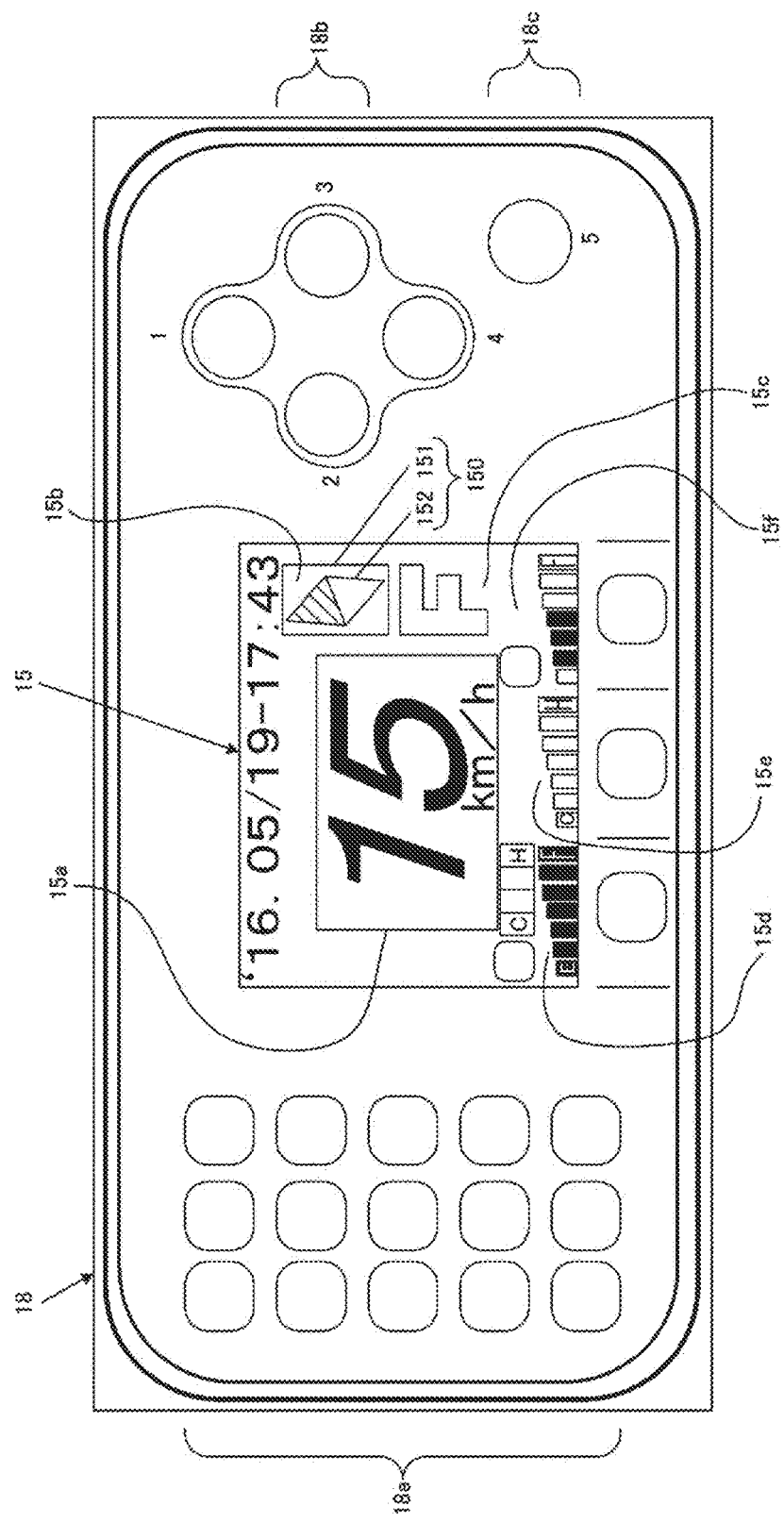
FIG. 2 is a plan view of a display of the tire steering angle display device.

An example of the display 15 in the embodiment is shown in FIG. 2. The display 15 is a liquid crystal display provided in a center portion of a display panel 18. A vehicle speed indicator 15*a* is provided at the center of the display, a steering information indicator 15*b* for displaying information relating to the steering is provided in the upper right corner. Below the steering information indicator 15*b*, and a forward-rearward operation information indicator 15*c* is provided. In the lower side of the display 15, the fuel indicator 15*d*, the water temperature indicator 15*e*, the torque converter oil temperature indicator 15*f* are provided from the left to the right sequentially.

On the left side of the display panel 18, a warning indication group 18*a* is provided, on the upper-right side of the display panel 18, an operation switch group 18*b* is provided, and also on the lower side of the display panel 18, an operation switch group 18*c* is provided.

Information relating to the steering displayed on the steering information indicator 15*b* will be described with reference to FIGS. 3 to 8.

Figure 3:
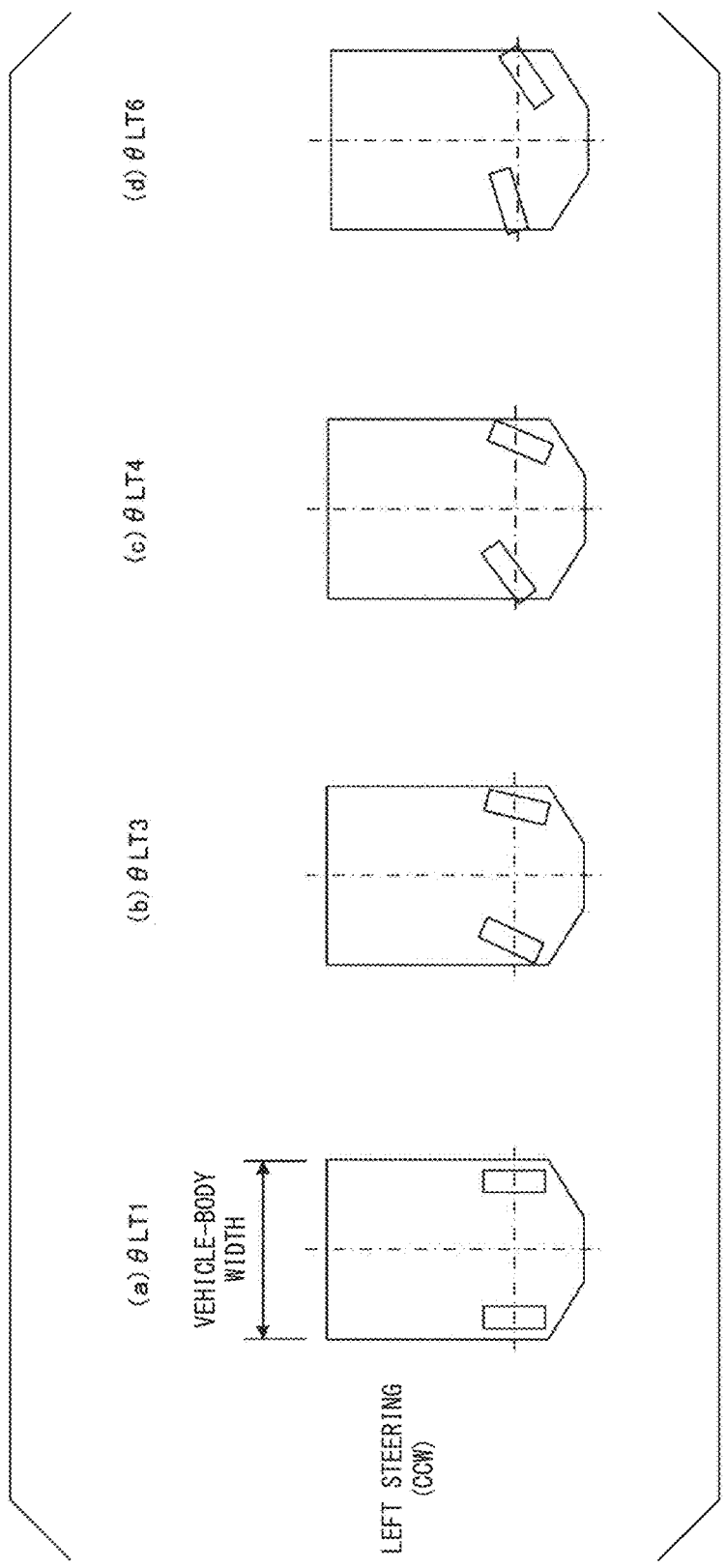
FIG. 3 is a view illustrating a turning angle of tire (a tire steering angle) with respect to a vehicle body in the case of, for example, a steering wheel of a forklift is operated to the left.

FIG. 3, shows the tire steering angle with respect to the vehicle body when steering the steering wheel to the left direction, that is, it shows a turning angle of tire (a tire steering angle).

FIG. 3(*a*) shows the tire steering angle (=0°) with respect to the vehicle body in a neutral position of the steering wheel (a neutral state), that is, the steering wheel is not operated to the left or right (θLT1). Left and right tires are parallel to the vehicle body and do not protrude from a vehicle body in a vehicle width.

FIG. 3(*b*) shows a state in which an inner-side tire (left tire) turns up to an inner-tire vehicle-body width which is just before where the inner-side tire protrudes from a vehicle body width, when steered to the left (θLT3). The tire is inclined only to an angle according to a steering amount with respect to the vehicle body; however, the left and right tires do not protrude from the vehicle body in the vehicle width.

FIG. 3(*c*) shows a state in which an outer-side tire (right tire) turns up to an outer-tire vehicle-body width which is just before where the outer-side tire protrudes from the vehicle body in the vehicle width when steered to the left (θLT4). The tire is inclined only to an angle according to a steering amount with respect to the vehicle body; the inner-side tire (left tire) protrudes from the vehicle body in the vehicle width, and the outer-side tire (right tire) does not protrude from the vehicle body in the vehicle width. FIG. 3(*d*) shows the tire steering angle with respect to the vehicle body when the tire steering angle is the maximum when steered to the left (θLT6). Both left and right tires protrude from the vehicle body in the vehicle width.

Figure 4:
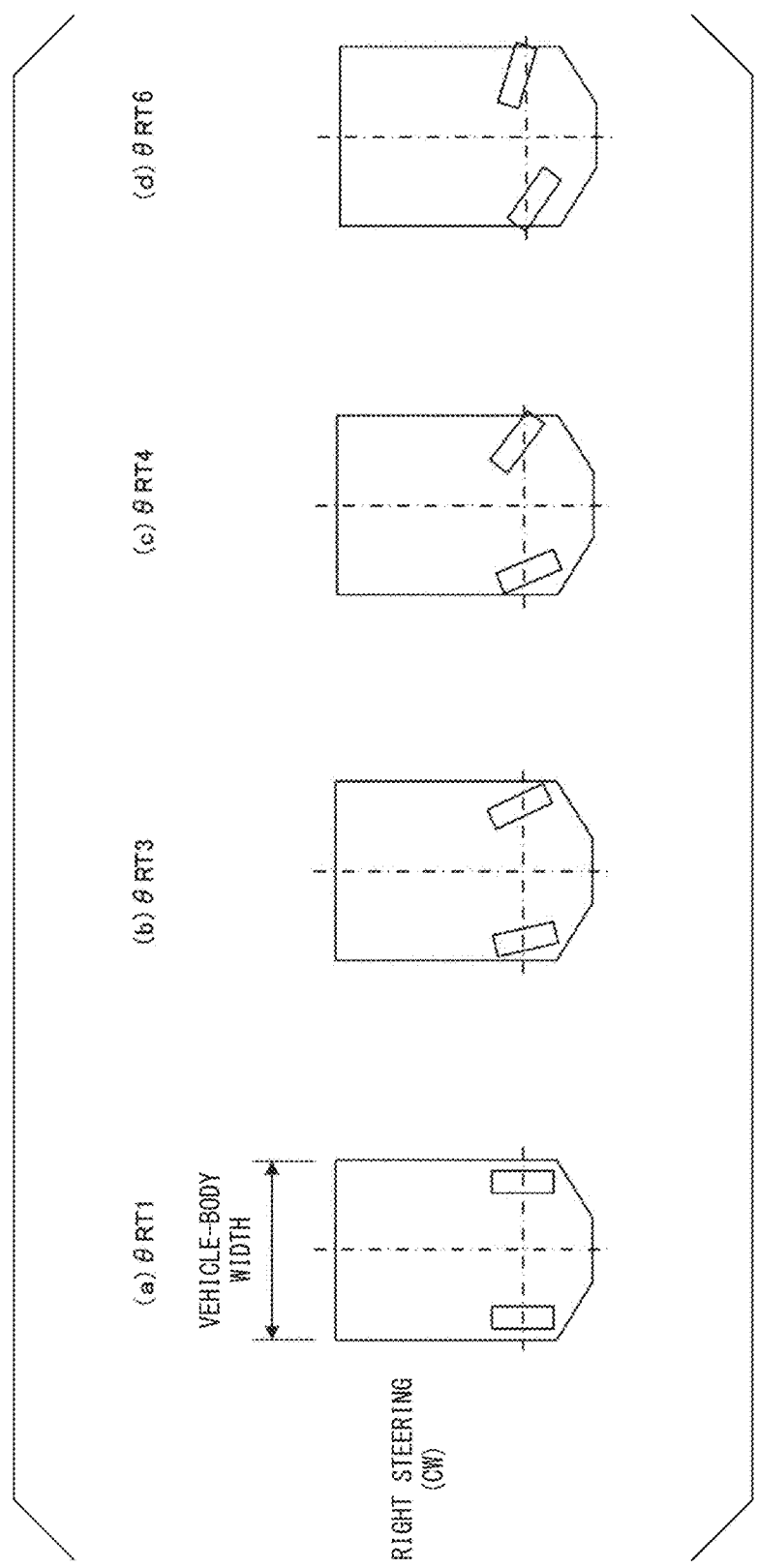
FIG. 4 is a view illustrating a tire steering angle with respect to the vehicle body in the case of the steering wheel of the forklift is operated to the right.

FIG. 4 shows the tire steering angle with respect to the vehicle body when steering the steering wheel to the right.

FIG. 4(*a*) shows the tire steering angle with respect to the vehicle body in a neutral position of the steering wheel (a neutral state), that is, the steering wheel is not operated to the left or right (θRT1).

FIG. 4(*b*) shows a state in which the inner-side tire (right tire) turns up to the inner-tire vehicle-body width which is just before where the inner-side tire protrudes from the vehicle body in the vehicle width, when steered to the right (θRT3). The tire is inclined only to an angle according to the steering amount with respect to the vehicle body; however, the left and right tires do not protrude from the vehicle body in the vehicle width.

FIG. 4(*c*) shows a state in which the outer-side tire (left tire) turns up to the outer-tire vehicle-body width which is just before where the outer-side tire protrudes from the vehicle body in the vehicle width, when steered to the right (θRT4). The tire is inclined only to the angle according to the steering amount with respect to the vehicle body; the right tire protrudes from the vehicle body in the vehicle width and the left tire does not protrude from the vehicle body in the vehicle width.

FIG. 4(*d*) shows the tire steering angle with respect to the vehicle body when the turning angle of the tire is maximum when steered to the right (θRT6).

Steering Information Indication Icon

Figure 5:
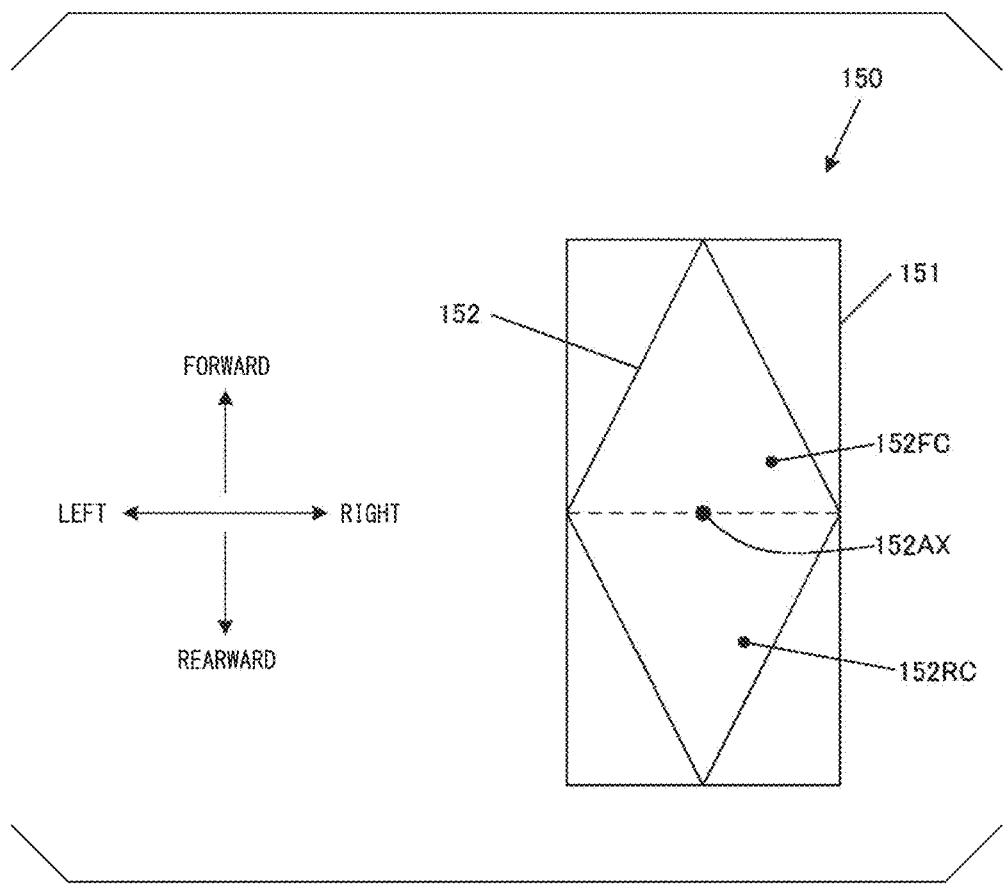
FIG. 5 is a diagram illustrating a steering information indication icon.

FIG. 5 shows a simulated diagram explaining the tire and the vehicle body of the steering information indicator 15*b*. The steering information indication icon (hereinafter, referred to "a steering icon") 150 includes a rectangular frame (a vehicle width indicator) 151 imitating the shape of the vehicle body, and a pointer (a control wheel indicator) 152 that has a rhombic shape and that imitates the tire which is displayed inside a rectangular frame 151 so as to be rotatable.

Indication Pattern Corresponding to Steering Amount

A pointer 152 rotates in a clockwise direction (CW) or a counter-clockwise direction (CCW) about a rotation axis 152AX which is the center of the rhombus. A rotation direction and a rotation angle of the pointer 152 are determined based on the steering direction and the steering angle of the tires by steering the steering wheel. The steering direction and the steering angle of the tires are detected by the steering angle detector 14. An image of a steering icon 150 is generated by an image generation unit 16 based on the steering direction and the steering angle output from the steering angle detector 14.

Indication Pattern Corresponding to Forward, Rearward, and Neutral

The pointer 152 also has three indication patterns corresponding to an operation position of the forward-rearward lever, that is, a forward position, a rearward position, and a neutral position. The operation position of the forward-rearward lever is detected by a lever operation position signal output from a forward-rearward movement detector 12. The lever operation position signal is input to the controller 11. The controller 11 sends the lever operation position signal to the image generation unit 16. The image generation unit 16 generates a pointer image having three indication patterns as shown in FIG. 6 according to the input lever operation position signal, that is, FIG. 6A shows a neutral indication pattern, FIG. 6B shows a forward movement indication pattern, and FIG. 6C shows a rearward movement indication pattern. The display 15 which has received the generated pointer image displays one of a neutral indication pointer 152N, a forward movement indication pointer 152F, and a rearward movement indication pointer 152R as shown in FIGS. 6A to 6C.

The forward movement indication pointer 152F is displayed when the forward-rearward lever is operated to the forward position. Therefore, the forward movement indication pointer 152F is also displayed when forward traveling and when stopping by a braking operation while forward traveling. The forward movement indication pointer 152F is an icon in which a pointer front area 152FC corresponding to a vehicle forward direction is emphatically displayed as compared with a pointer rear area 152RC corresponding to a vehicle rearward direction (see FIG. 6B). The rearward movement indication pointer 152R is displayed when the forward-rearward lever is operated to the rearward position. Therefore, the rearward movement indication pointer 152R is also displayed when rearward travelling and when stopping by the braking operation while rearward travelling. The rearward movement indication pointer 152R is an icon in which the pointer rear area 152RC corresponding to the vehicle rearward direction is emphatically displayed as compared with the pointer front area 152FC corresponding to the vehicle forward direction (see FIG. 6C). The neutral indication pointer 152N is displayed when the forward-rearward lever is operated to the neutral position. Therefore, the neutral indication pointer 152N is also displayed when inertia travelling and when the vehicle is stopped. The neutral indication pointer 152N is an icon in which the pointer front area 152FC and the pointer rear area 152RC are displayed in the same enhancement degree (see FIG. 6A).

In addition, the vehicle travels inertia when the forward-rearward lever is operated to the neutral position during a forward movement or a rearward movement of the vehicle. At this time, when the steering wheel is steered, the steering icon 150 displays the neutral indication pointer 152N with rotating the neutral indication pointer 152N according to the steering angle. The neutral indication pointer 152N is displayed with rotating the neutral indication pointer 152N according to the steering angle even in the case of steering the steering wheel when the vehicle is stopped while the forward-rearward lever is operated in the neutral position.

Displaying emphatically the indication of the forward and rearward movements may also be emphasized by, for example, a color representing the forward movement and the rearward movement by the pointer front area 152FC and the pointer rear area 152RC being made to have different colors from each other.

Indication Pattern Corresponding to Vehicle Speed

Furthermore, the pointer 152 also displays the indication pattern corresponding to the vehicle speed. When the vehicle speed is less than or equal to a predetermined value, the pointer 152 blinks, and when the vehicle speed exceeds the predetermined value, the pointer 152 lights up. That is, as shown in FIG. 6D, the indication pointers 152N, 152F, 152R respectively showing the neutral position of the forward-rearward lever in FIG. 6A, the forward movement position of the forward-rearward lever in FIG. 6B, and the rearward movement position of the forward-rearward lever in FIG. 6C blink or light up.

Indication Pattern of Rectangular Frame

Figure 7:
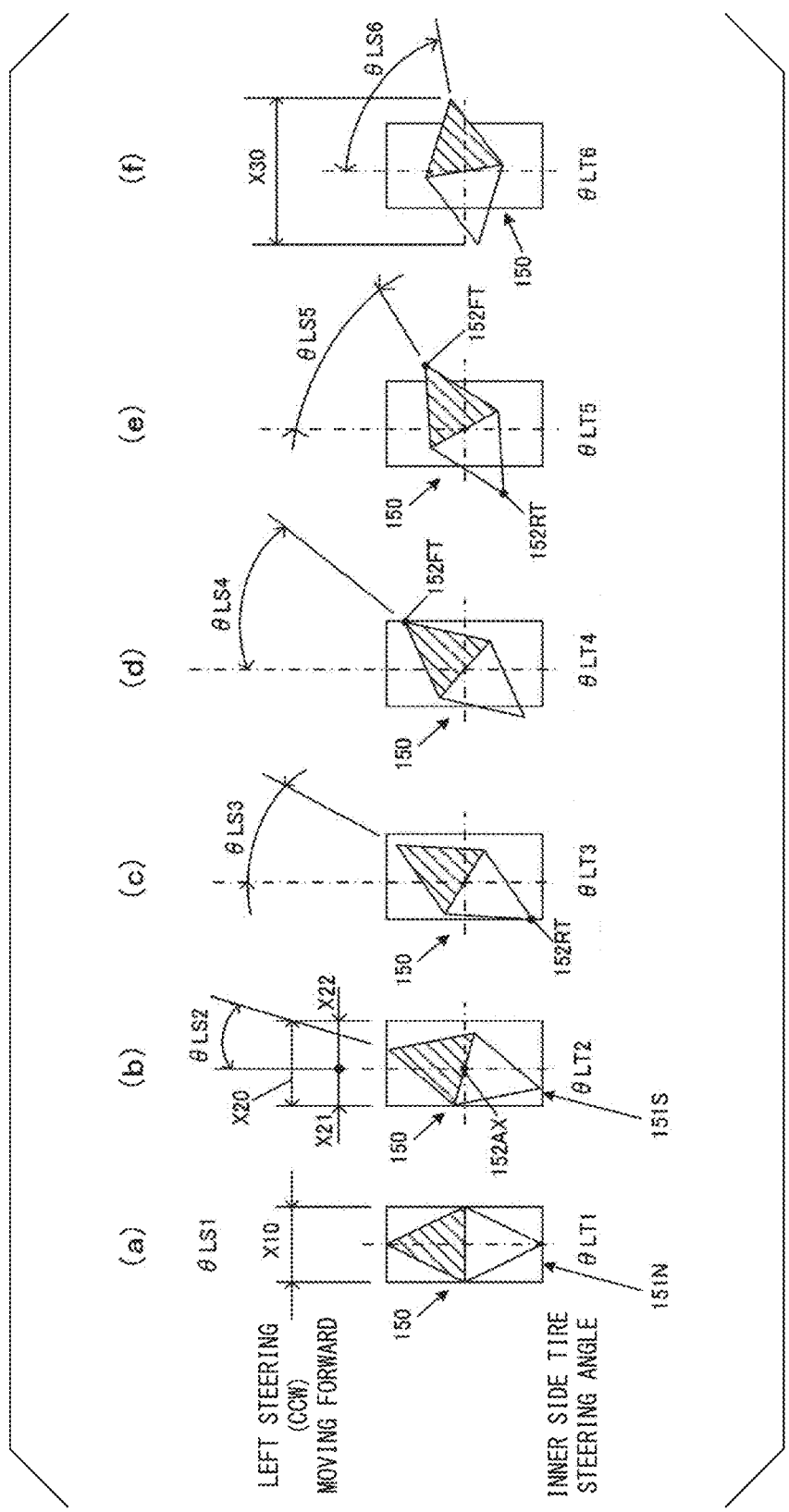
FIG. 7 is a transition diagram of the steering information indication icon in the case of the steering wheel is operated to the left.

FIG. 7 shows a transition of the indication pattern of the steering icon 150 when the steering wheel is steered to the left.

As mentioned above, the steering icon 150 includes the rectangular frame 151 and the pointer 152 having the rotation axis 152AX inside the rectangular frame 151. As will be described later, a width of the rectangular frame 151 varies based on the steering angle. In the embodiment, there are two kinds of width, which are a narrow width in the neutral position of the steering wheel and a wide width after starting steering. The pointer 152 is displayed in a plurality of indication patterns defined by a driving condition including the steering amount of the tire, the forward movement, rearward movement, and neutral states of the vehicle, and the speed of the vehicle.

Indication pattern of Pointer corresponding to Tire Angle

FIGS. 7(a) to (f) show six indication patterns in which the pointer 152 rotates about the rotation axis 152AX inside the rectangular frame 151. As shown in FIGS. 7(a) to (f), a steering angle $\theta$, which is the tire steering angle, shown by $\theta LT1$ (0°), $\theta LT2$, $\theta LT3$, $\theta LT4$, $\theta LT5$, and $\theta LT6$ is displayed so as to correspond to inclination angles of the pointer 152 shown by $\theta LS1$ (0°), $\theta LS2$, $\theta LS3$, $\theta LS4$, $\theta LS5$, and $\theta LS6$.

For example, when the steering angle is 0°, the pointer 152 is displayed in a neutral indication pattern of a rotation angle $\theta LS1$ shown in FIG. 7(a). When the steering angle increases from 0° to $\theta LT2$, the pointer 152 is displayed in the indication pattern of the rotation angle LS2 shown in FIG. 7(b) until the steering angle reaches $\theta LT2$. After reaching $\theta LT2$ and until the steering angle reaches $\theta LT3$, the indication pattern is displayed in a rotation angle $\theta LS3$ as shown in FIG. 7(c). After reaching $\theta LT3$ and until the steering angle reaches $\theta LT4$, the indication pattern is displayed in the rotation angle $\theta LS4$ as shown in FIG. 7(d). After reaching $\theta LT4$ and until the steering angle reaches $\theta LT5$, the indication pattern is displayed in the rotation angle $\theta LS5$ as shown in FIG. 7(e). After reaching $\theta LT5$ and until the steering angle reaches $\theta LT6$, the indication pattern is displayed in the rotation angle $\theta LS6$ as shown in FIG. 7(f). In this manner, when the steering angle transits from $\theta LT1$ to $\theta LT6$, the indication pattern of the pointer 152 is switched.

Indication Pattern of Rectangular Frame Corresponding to Tire Steering

The width of a rectangular frame 151S during steering can be determined as follows. The description explains about the case when steered to the left.

Widening and Narrowing of the Vehicle Body Frame when Steered to the Left

As shown in FIG. 7(a), the rotation axis 152AX of the pointer 152 is set in the center of a rectangular frame 151N in the neutral position of the steering wheel and the width of the rectangular frame is set as the same as the maximum width of the rhombic shape or approximately the same width to such an extent that the pointer does not protrude. In the neutral position of the steering wheel, the steering angle $\theta$ is $\theta LT1$ (0°). At this time, a lateral width of the rectangular frame 151N is consistent with a lateral width of the central portion of the pointer 152. A size of the width of the rectangular frame 151 is indicated by X10 in FIG. 7(a). The steering wheel is steered, a steering angle $\theta$ of the tire exceeds 0° and until the steering angle $\theta$ of the tire reaches $\theta LT2$, as shown in FIG. 7(b), the rectangular frame 151 is set to the rectangular frame 151S which is wider than the width of the rectangular frame 151N of the neutral position of the steering wheel. In FIG. 7(b), the size of the width of the rectangular frame 151 is indicated by X20. As shown in FIGS. 7(c) to (f), while the steering angle $\theta$ varies up to $\theta LT6$ beyond the θLT2, the rectangular frame 151 keeps the same width that is the rectangular frame 151S having a wide width. In the embodiment, the rectangular frame 151 is displayed in two the indication patterns of the rectangular frame 151N in the neutral position of the steering wheel and the rectangular frame 151S when steering the steering wheel.

In addition, the reference numeral X30 shown in FIG. 7(*f*) represents a size of width of the pointer 152. In FIG. 7(*f*), a protrusion amount of the inner tire side is X30/2−X21, and the protrusion amount of the outer tire side is X30/2−X22. Since X22>X21, the protrusion amount of the inner tire side is larger than that of the outer tire side in the forklift of the embodiment.

In a size of the width X20 of the rectangular frame 151 of FIG. 7(*b*) when steering, the width on the left side of the rotation axis 152AX is defined as X21, and the width on the right side thereof is defined as X22. That is, when steering is started, the rectangular frame 151 which is the vehicle width indicator is asymmetric with respect to a line segment passing the rotation axis 152AX. This asymmetry depends on the specification of the steering device of the vehicle main body such as a vehicle width of the vehicle main body, the steering angle that the control wheel starts to protrude, and the structure in which either one from the inner tire or the outer tire starts to protrude first. In the forklift in which the steering display device of the embodiment is mounted, since the inner tire protrudes first, the rectangular frame 151 is widened to the outer tire side as shown in FIG. 7(*b*). That is, the rectangular frame 151 is widened in a direction opposite to the direction in which any one of inner and outer tires protruding first is located.

As shown in FIGS. 7(*a*) to (*b*), when steering of the steering wheel to the left is started, a size (a distance) between the rotation axis 152AX and an outer-tire-side (right side) vehicle-width line 151R is increased. When steering of the steering wheel to the right is started, a size (a distance) between the rotation axis 152AX and the outer-tire-side (left side) vehicle-width line 151L is increased.

As shown in FIG. 3(*b*), in the state in which the inner-side tire turns up to the inner-tire vehicle-body width which is just before where the inner-side tire protrudes from the vehicle body in the vehicle width when steered to the left, the steering icon 150 shown in FIG. 7 (*c*) is displayed in the display 15. As shown in FIG. 3(*c*), in the state in which the outer-side tire turns up to the outer-tire vehicle-body width which is just before where the outer-side tire protrudes from the vehicle body in the vehicle width when steered to the left, the steering icon 150 shown in FIG. 7(*d*) is displayed in the display 15. In FIG. 7(*c*), as shown in an enlarged view in FIG. 8A, a tip 152RT of the pointer rear area 152RC is consistent with the left vehicle-width line 151L. In FIG. 7(*d*), as shown in the enlarged view in FIG. 8B, a tip 152FT of the pointer front area 152FC is consistent with the right vehicle-width line 151R of the rectangular frame 151. The size of the width of the rectangular frame 151 is determined so that the pointer 152 does not protrude from the rectangular frame 151 in any of the indication pattern in FIG. 7(*c*) and FIG. 7(*d*).

In Forward Position of Forward-Rearward Lever

In FIGS. 7(*a*) to (*f*), six indication patterns of the steering icon 150 when steered to the left in a case where moving forward by operating forward-rearward lever to the forward position are displayed. The steering icon 150 makes a transition at a first indication pattern to a sixth indication pattern. The first indication pattern is an indication pattern in which the steering wheel is in the neutral position during the forward movement. The second indication pattern is an indication pattern in which the steering angle is larger than θLT1 (0°) and less than or equal to θLT2 during the forward movement. The third indication pattern is an indication pattern in which the steering angle is larger than θLT2 and less than or equal to θLT3 during the forward movement. The fourth indication pattern is an indication pattern in which the steering angle is larger than θLT3 and less than or equal to θLT4 during the forward movement. The fifth indication pattern is an indication pattern in which the steering angle is larger than θLT4 and less than or equal to θLT5 during the forward movement. The sixth indication pattern is an indication pattern in which the steering angle is larger than θLT5 and more than or equal to θLT6 during the forward movement. In addition, as mentioned above, in the steering icon 150 of the forward movement, the pointer front area 152FC of the pointer 152 is emphatically displayed as shown in FIG. 6B.

In the case where moving forward by operating the forward-rearward lever to the forward position, the steering icon 150 displayed when steering to the right has five indication patterns. Therefore, in the forward position of the forward-rearward lever, the indication pattern when steered to the left and right has eleven patterns.

In Rearward Position of Forward-Rearward Lever

In a case where moving rearward by operating the forward-rearward lever to the rearward position, the steering icon 150 displayed when steered to the left also makes a transition at the seventh indication pattern to a twelfth indication pattern as described below. In addition, as mentioned above, in the steering icon 150 in the rearward position of the forward-rearward lever, the pointer rear area 152RC of the pointer 152 is emphatically displayed as shown in FIG. 6C.

A seventh indication pattern is an indication pattern in which the steering wheel is in neutral position during the rearward movement. Eighth indication pattern is an indication pattern in which the steering angle is larger than θLT1 (0°) and less than or equal to θLT2 during the rearward movement. The ninth indication pattern is an indication pattern in which the steering angle is larger than θLT2 and less than or equal to θLT3 during the rearward movement. The tenth indication pattern is an indication pattern in which the steering angle is larger than θLT3 and less than or equal to θLT4 during the rearward movement. The eleventh indication pattern is an indication pattern in which the steering angle is larger than θLT4 and less than or equal to θLT5 during the rearward movement. The twelfth indication pattern is an indication pattern in which the steering angle is larger than θLT5 and more than or equal to θLT6 during the rearward movement.

In the case where moving rearward by operating the forward-rearward lever to the rearward position, the steering icon 150 displayed when right steered has five indication patterns. Therefore, the indication pattern of the rearward position of the forward-rearward lever when steered to the left and right has eleven patterns, as well.

In Neutral Position of Forward-Rearward Lever

When the forward-rearward lever is in the neutral position, the vehicle travels with inertia. At this time, when the steering wheel is operated, the steering icon 150 is displayed in a manner such that the neutral indication pointer 152N rotates according to the steering angle. That is, when the forward-rearward lever is operated in the neutral position and when steered to the left during traveling forward with inertia, the steering icon 150 is switched between six indication patterns of the thirteenth indication pattern (0° steering angle=neutral position of the steering wheel) to eighteenth indication pattern (maximum steering angle), as with the first indication pattern to the seventh indication pattern and the eighth indication pattern to the twelfth indication pattern described above, in response to the steering angle. In addition, as mentioned above, in the neutral steering icon 152N, both the front pointer area 152FC and the rear pointer area 152RC of the pointer 152 are emphatically displayed as shown in FIG. 6A.

In a case where the forward-rearward lever is operated in the neutral position and the vehicle travels rearward with inertia, the steering icon 150 displayed when steered to the right has five indication patterns. Therefore, the indication pattern when steered to the left and right has eleven patterns even in the neutral position.

The indication pattern in thirty-three patterns of the steering icon 150 according to the operation position of the forward-rearward lever when steered to the left and right is shown in FIGS. 9 to 14. The indication pattern in thirty-three patterns takes further two kinds of the indication pattern which depends on the vehicle speed. That is, the further two kinds of the indication pattern are light-up of at low speed and blinking at high speed. Therefore, the display device of the embodiment takes sixty-six patterns of the indication pattern.

In the above description, as shown in FIG. 7, the steering angle from the neutral position of the steering wheel to the maximum steering angle is divided into five steps of a steering angle range of FIGS. 7(a) to (b), FIGS. 7(b) to (c), FIGS. 7(c) to (d), FIGS. 7(d) to (e), FIGS. 7(e) to (f) in addition to FIG. 7(a) of the neutral position of the steering wheel, and the steering icon 150 is switched and displayed with a stepwise steering angle. The pointer 152 may be continuously rotated according to the steering angle continuously detected.

An indication pattern control of the steering icon 150 representing steering information as described above will be described with reference to a flow chart of FIG. 15.

Figure 15:
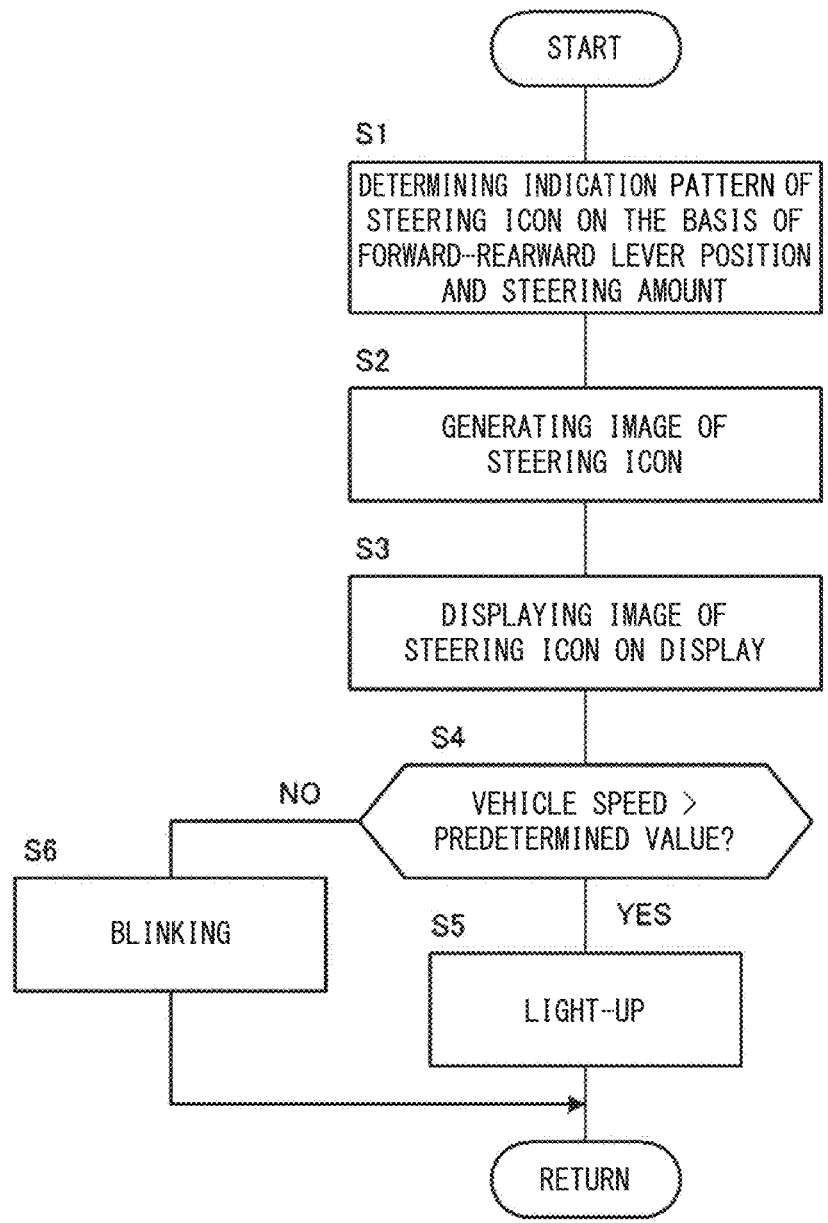
FIG. 15 is a flow chart illustrating a display control of the steering information indication icon of the embodiment.

The flow chart in FIG. 15 shows processing steps by a program executed by CPU etc. in the controller 11 of FIG. 1. The program is stored in a computer-readable non-transitory tangible recording medium included in a computer system having the controller 11 and CPU. The computer system (computer) reads and executes this program such that the process is performed. Here, the computer-readable non-transitory tangible recording medium refers to a magnetic disk, a magnetic optical disc, a CD-ROM, a DVD-ROM, a semiconductor memory, or the like. Further, this computer program may be distributed to the computer by a communication line, and the computer receiving the program may execute the program. The program starts an operation when a key switch (not shown) is turned on. In a step S1, a combination of an operation state of the forward-rearward lever of on the basis of signals from the forward-rearward movement detector 12 and the steering angle detector 14 with the steering state of the tire according to the steering of the steering wheel is determined. The number of the combinations are thirty three, as described above.

When stepped into a step S2, the image generation unit 16 generates an image of the steering icon 150 of the indication pattern determined by the step S1 and the program proceeds to a step S3. In the step S3, a drawing data of the steering icon 150 generated at the step S2 is displayed on the display 15. In a step S4, the CPU determines whether a speed signal from the vehicle speed detector 13 is more than or equal to a predetermined speed, and when the speed signal is more than or equal to the predetermined speed, the program proceeds to a step S5. In the step S5, a lighting device of the display 15 is lighted-up. When it is determined that the vehicle speed is less than the predetermined speed in the step S4, the program proceeds to a step S6, and the lighting device of the display 15 is blinked. Therefore, the steering icon 150 displays the tire steering angle with sixty six patterns of the indication pattern. When a process of the step S5 or the step S6 is executed, the program is to return to a predetermined routine.

According to such processing steps, in the neutral position of the steering wheel and at an operation steered to the left and right, the steering icon 150 is displayed on the display 15 with thirty three patterns of the indication pattern defined by the combination of forward-rearward-neutral information and steering information. Furthermore, these thirty three patterns of the steering icon 150 are displayed with lighting-up or blinking based on the vehicle speed. Therefore, the steering display device in the embodiment, sixty six patterns of the steering icon 150 are switched and displayed based on the operation state.

The steering display device of the embodiment described above can exhibit the following operation and effects.

(1) A steering display device 10 of the work vehicle of the embodiment that visually displays a steering state of the tire includes: the display 15 that displays the vehicle width indicator (the rectangular frame) 151 representing the vehicle width of the vehicle and the control wheel indicator (the pointer) 152 representing a state of steering of the tire as the steering icon 150 which is graphic information; and the image generation unit 16 that rotates a control wheel indicator 152 about the rotation axis 152AX on the basis of the steering angle of the control wheel and widens or narrows a vehicle width indicator 151 based on the steering of the control wheel. The image generation unit 16 generates the control wheel indicator 152 and the vehicle width indicator 151 in a manner such that part of the control wheel indicator 152 protrudes from the vehicle width indicator 151 in the predetermined value of the steering angle of more than or equal to θLT4. Particularly in the steering display device 10 of the embodiment, according to the image generation unit 16, the steering icon 150 is displayed as follows. As shown in FIGS. 7 (a) to (b), the size of the vehicle width X20 of the vehicle width indicator 151 when steered is wider than the size of the vehicle width X10 at a neutral position of the steering wheel. In other words, the size of the vehicle width of the vehicle width indicator 151 varies based on the steering angle, and the size of the width X10 of the vehicle width indicator 151N in the neutral position of the steering wheel is small as compared with the size of the width X20 of a vehicle width display 151S in steering. Also, the rotation axis 152AX of the control wheel indicator 152 is set to the inside of the vehicle width indicator 151.

Figure 8A:
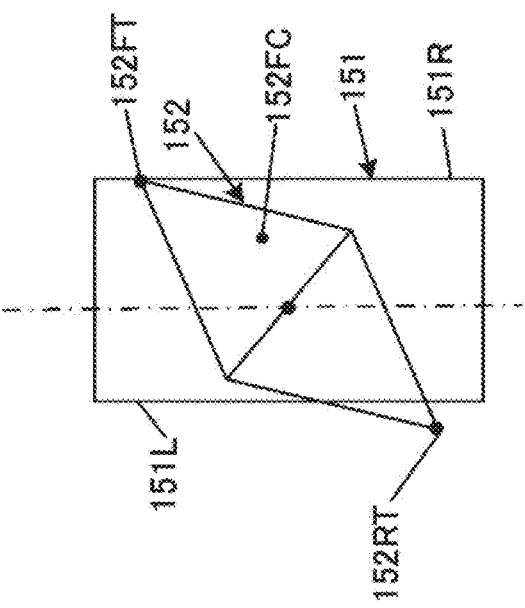
FIG. 8A is an enlarged view of FIG. 7(c).
Figure 8B:
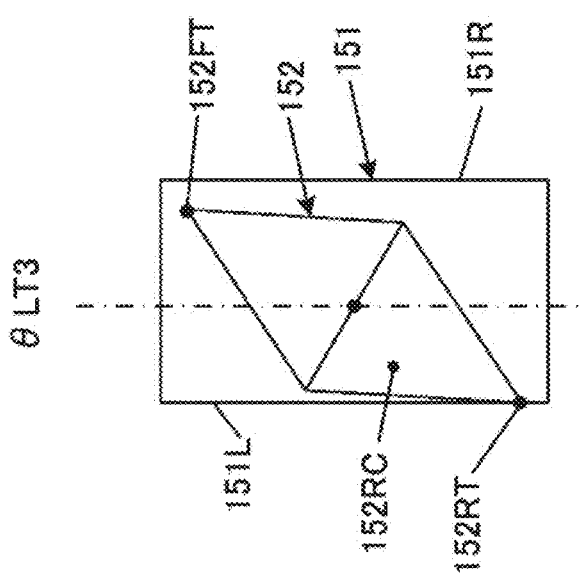
FIG. 8B is an enlarged view of FIG. 7(d).
Figure 9:
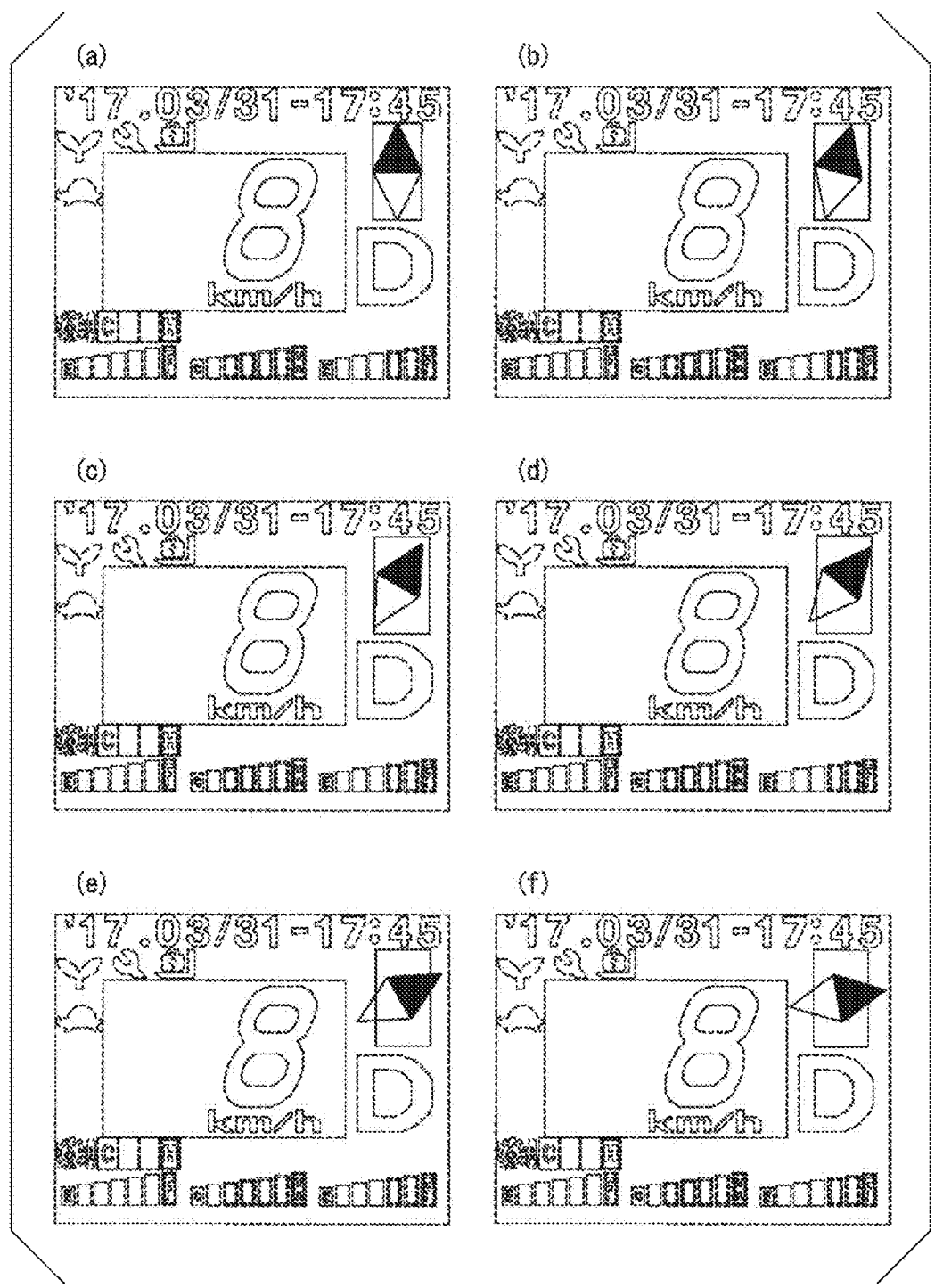
FIG. 9 is a diagram illustrating the steering information indication icon at the time of steering to the left while moving forward.
Figure 10:
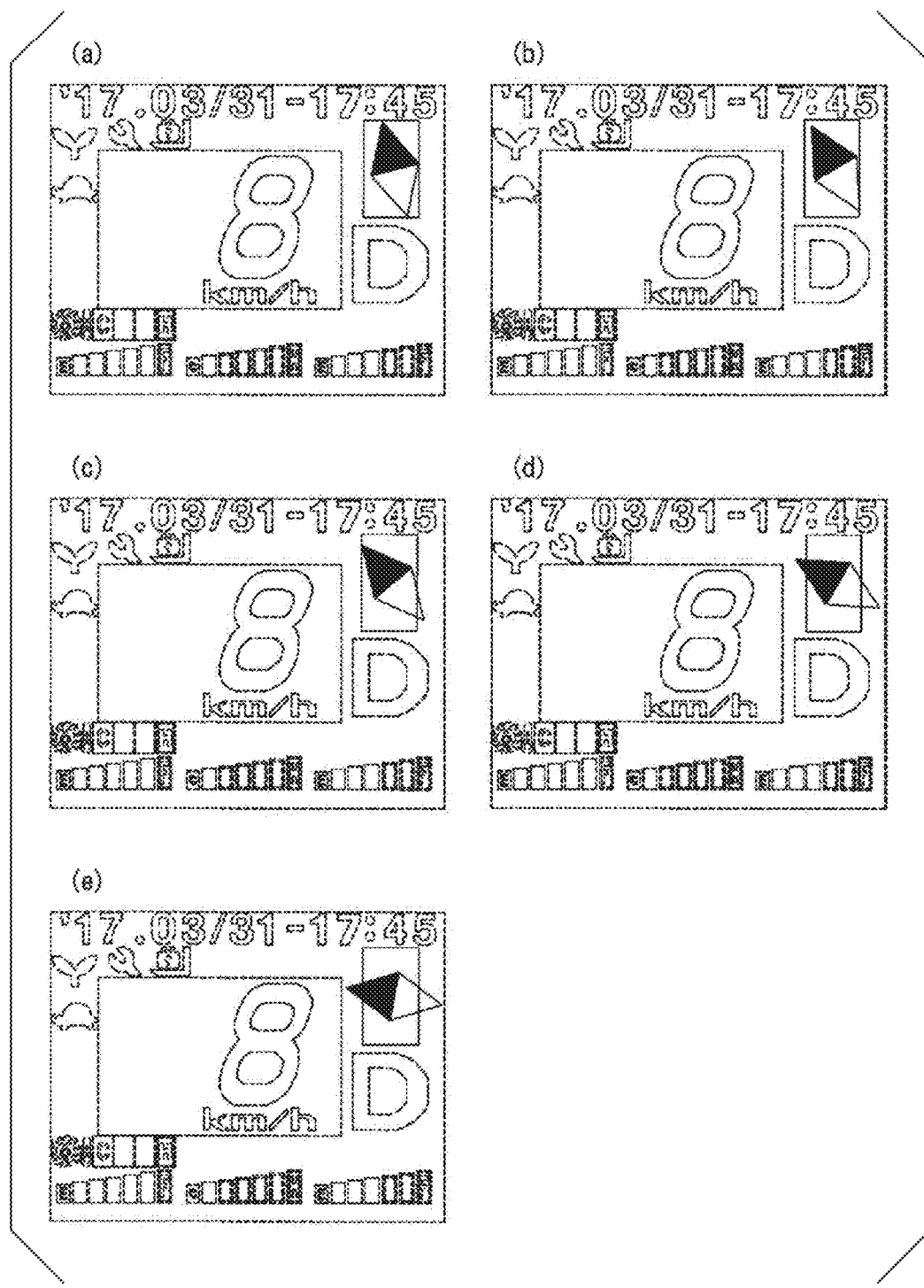
FIG. 10 is a diagram illustrating the steering information indication icon at the time of steering to the right while moving forward.
Figure 11:
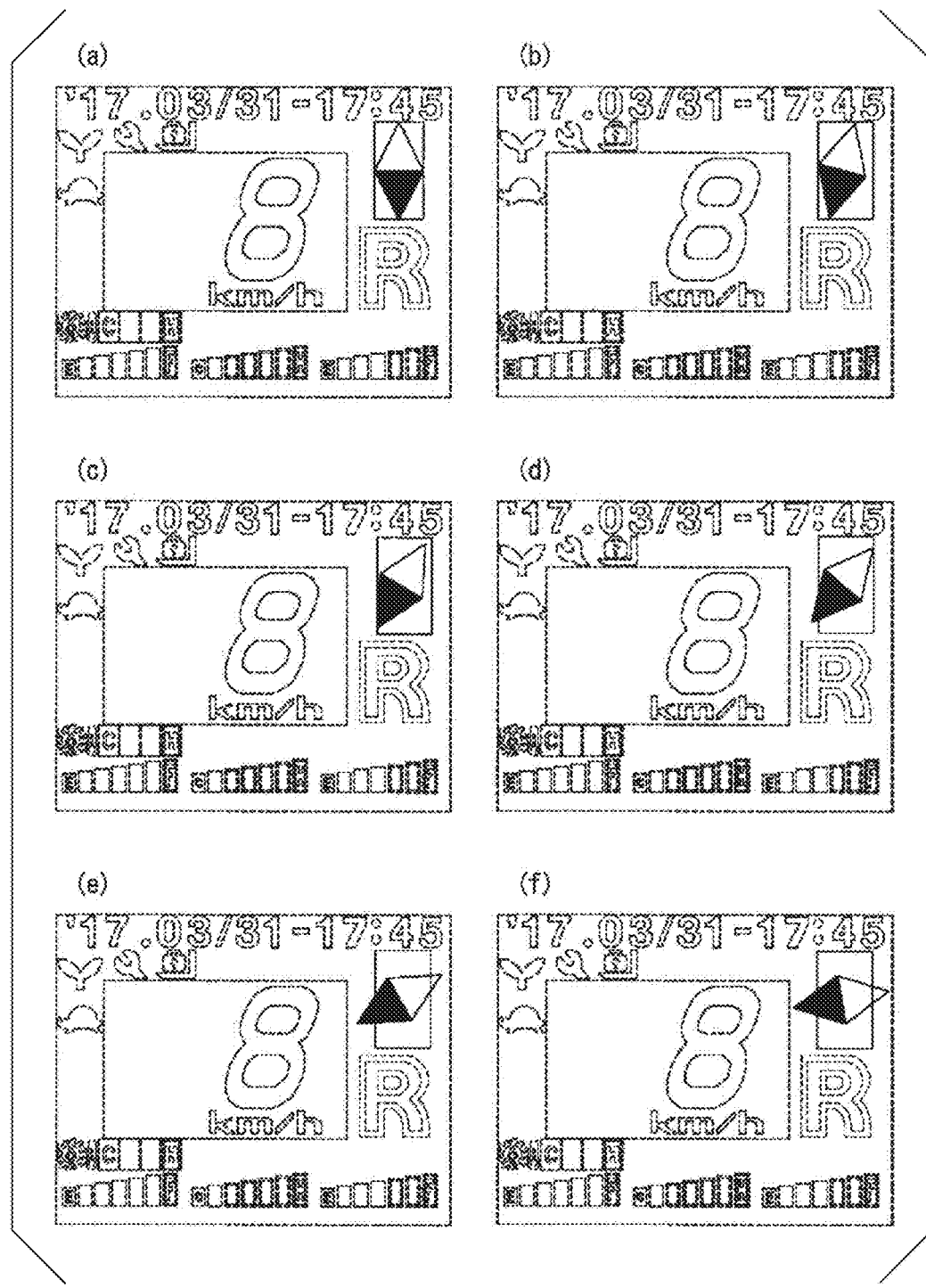
FIG. 11 is a diagram illustrating the steering information indication icon at the time of steering to the left while moving rearward.
Figure 12:
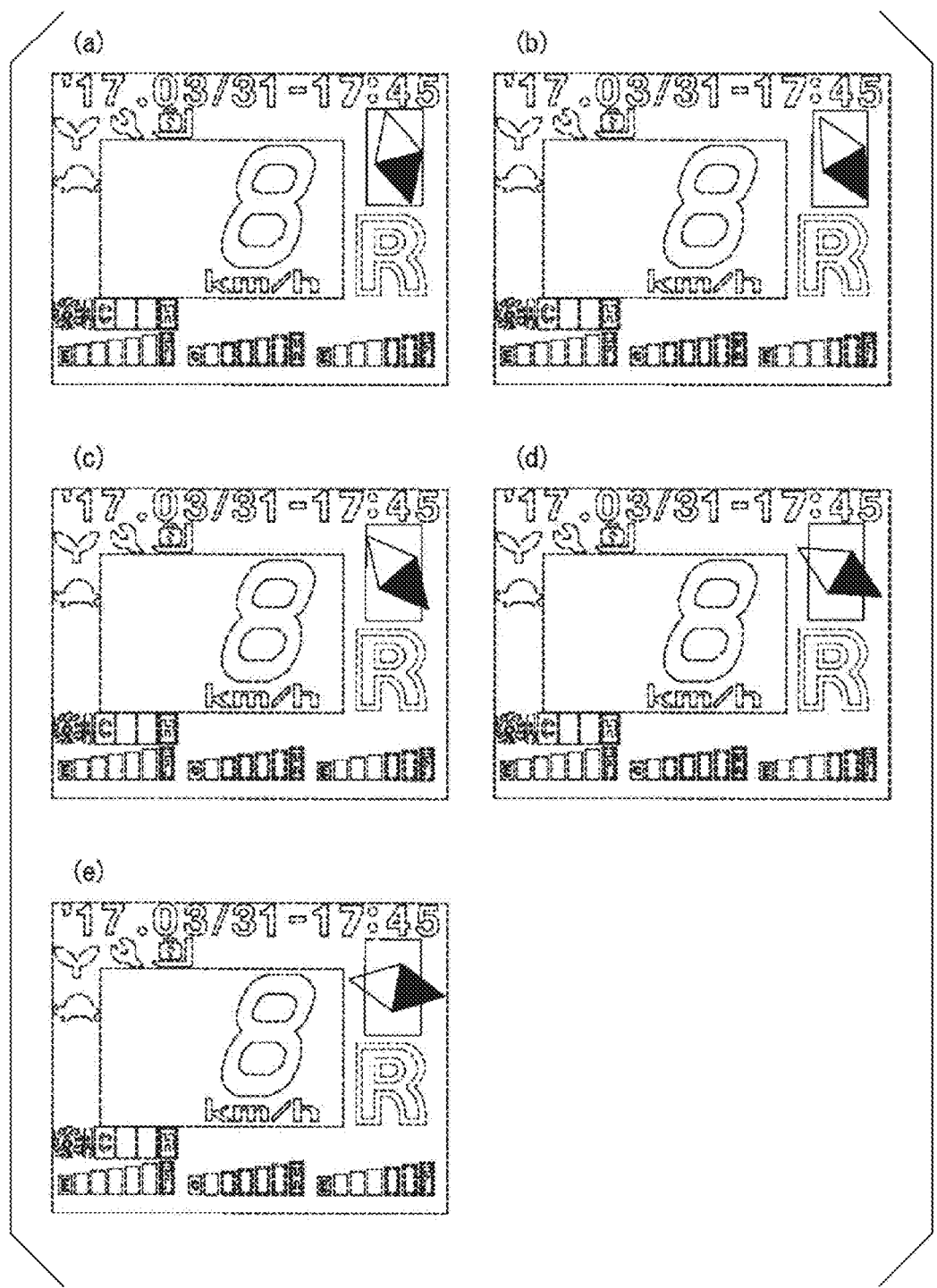
FIG. 12 is a diagram illustrating the steering information indication icon at the time of steering to the right while moving rearward.
Figure 13:
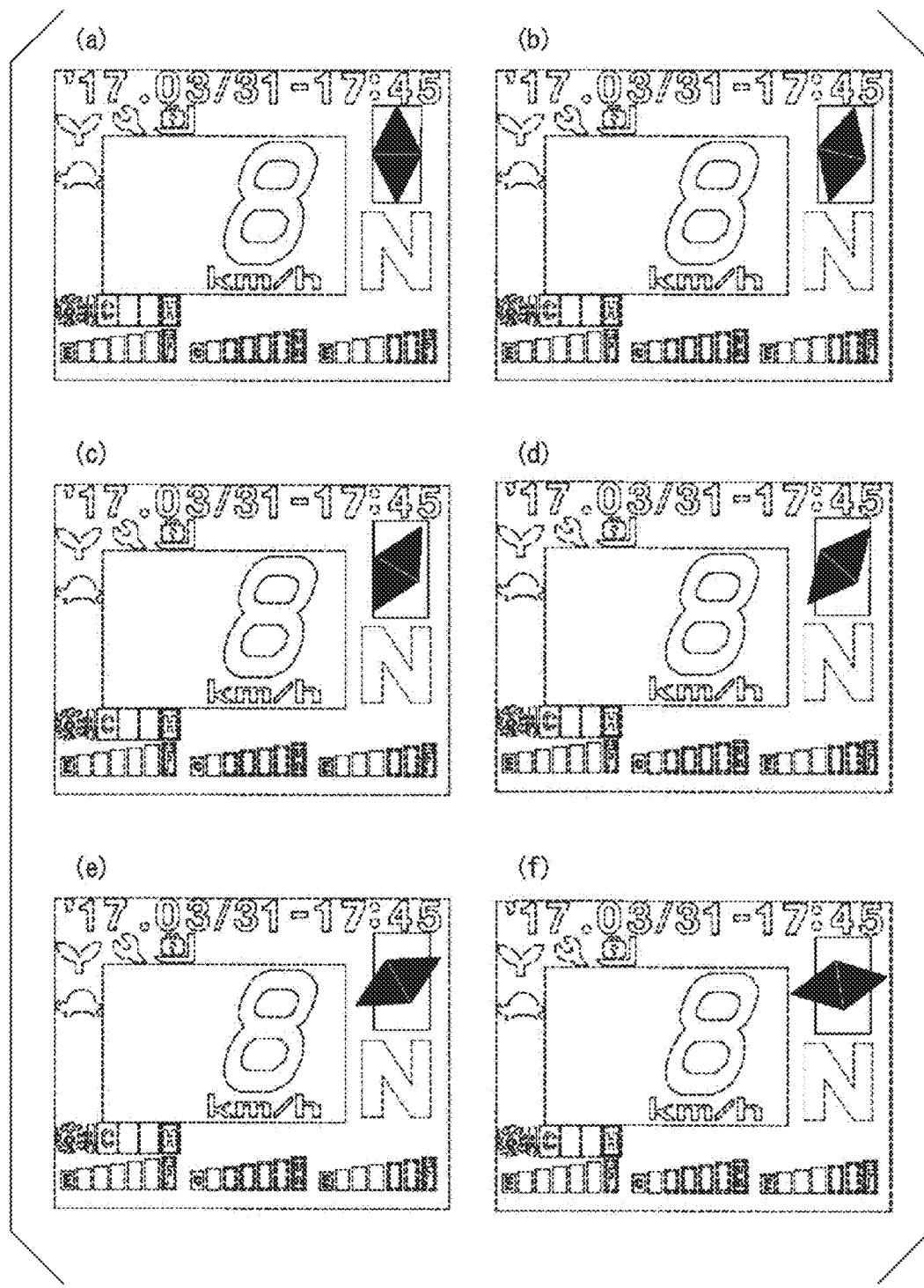
FIG. 13 is a diagram illustrating the steering information indication icon at the time of steering to the left in a neutral position of a forward-rearward lever.
Figure 14:
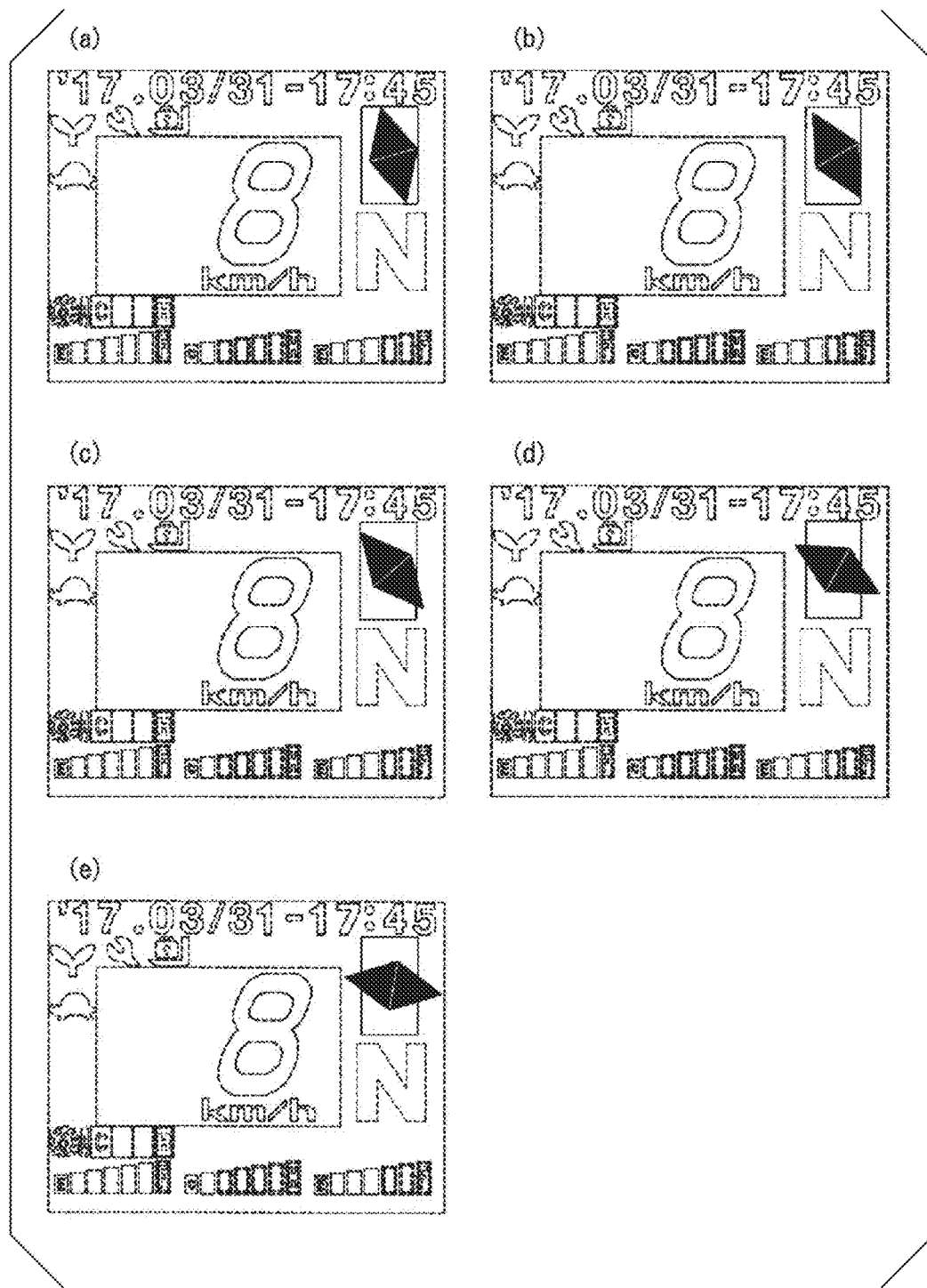
FIG. 14 is a diagram illustrating the steering information indication icon at the time of steering to the right in the neutral position of the forward-rearward lever.

Also, until a first steering angle θLT3 (FIG. 7 (c)), that is, just before where the tire starts to protrude from the vehicle body, the control wheel indicator 152 is located at the inside of the vehicle width indicator 151. As shown in FIGS. 7(c) to (d), when the steering angle exceeds the first steering angle θLT3 and reaches a second steering angle θLT4, part of the control wheel indicator 152, specifically, the inner-tire-side tip 152RT of the pointer 152 as shown in FIG. 8B in the embodiment is located at an outside of the left vehicle-width line 151L of the vehicle width indicator 151. The tip 152FT of the front area 152FC of the pointer 152 coincides with the right vehicle-width line 151R. Also, as shown in FIG. 7(e), when the steering angle exceeds a third steering angle θLT5, the outer-tire-side tip 152FT of the pointer 152 which is the control wheel indicator is located at an outside of the right vehicle-width line 151R of the vehicle width indicator 151.

According to the steering display device configured in this way, it is possible for operator to visually confirm the tire steering angle and the protrusion of the tire from a lateral face of the vehicle without getting off from the work vehicle, such as the forklift. In particular, when steering the work vehicle, such as the forklift, in a narrow premises, it is possible to accurately display as graphical information whether the outer tire protrudes from the lateral face of the vehicle, the inner tire protrudes from the lateral face of the vehicle, or both the outer tire and the inner tire protrude from the lateral face of the vehicle.

(2) The steering icon 150 includes a pair of line segments 151L, 151R facing each other and representing the vehicle width of at least the right and left of the vehicle display. In distances between the rotation axis 152AX of the control wheel indicator 152 and the pair of the line segments 151L, 151R, the distance between the rotation axis 152AX and the outer-tire-side vehicle-width line segment 151R becomes large even in steering to the left or to the right.

The image generation unit 16 of the embodiment generates the steering icon 150 by a combination of the rotation angle of the pointer 152 with widening or narrowing the vehicle width indicator 151. Therefore, as compared with the display system in which the size of the vehicle width of the vehicle width indicator 151 is set at constant and the pointer 152 is rotated according to the steering angle, it is possible to design precisely according to the protruding situation of tires of the inner and outer tires protruding from the vehicle width when steered, for example, the protrusion amount according to a type of the vehicle.

(3) A vehicle forward-rearward movement information is displayed by emphasizing the forward movement side or the rearward movement side of the pointer 152 of the control wheel indicator. The pointer 152 of the control wheel indicator is blinked at low speed, and the pointer 152 of the control wheel indicator is lighted-up at high speed. Thus, a lot of operational information about the steering can be displayed together using fewer types of icons. As a result, the display 15 and eventually the display panel 18 can be miniaturized.

(4) In the steering display device of the embodiment, for example, when leftward steering is performed in a case where the forward-rearward lever is operated in the forward position, in addition to the neutral position of the steering wheel as shown in FIG. 7(a), the steering icon 150 is displayed in five steps as shown in FIGS. 7(a) to (b), FIGS. 7(b) to (c), FIGS. 7(c) to (d), FIGS. 7(d) to (e), and FIGS. 7(e) to (f), and furthermore, when rightward steering is performed, the steering icon 150 is switched and displayed further in five steps. That is, by sectioning the tires in a neutral state and the steering angle range of 10 stages at steering, the steering icon 150 is switched and displayed in eleven different indication patterns with the steering angle in the stepwise manner. Therefore, as compared with the process of rotating of the steering angle that continuously varies in real time, it is possible to suppress the load of CPU and the image generation unit 16 of the controller 11.

The above-described steering display device may be modified to the following modifications.

First Modification

A pointer shape of the steering icon is not limited to the rhombic shape. Instead of the pointer shape, a rectangular shape simulating the tire shape may be adopted, and the indication pattern may be changed such that one end in the longitudinal direction is defined as the forward direction and the other end is defined as a rearward direction, in a forward-rearward movement indication.

A double-headed arrow icon having an arrow at both ends may be used as the steering icon. Both arrows are displayed in the same indication pattern when the vehicle is in a neutral state, the arrow at the forward movement side is emphasized when moving forward, and the arrow at the rearward side is emphasized when moving rearward.

A Single-headed arrow icon having an arrow at one end may be used as the steering icon. An arrow directing a forward movement side is displayed when moving forward, and an arrow directing a rearward movement side is displayed when moving rearward.

Second Modification

The icon showing the vehicle width is also not limited to the rectangular frame. The vehicle width may be displayed by a pair of line segments consisting only of the left and right vehicle width lines. The length corresponding to the vehicle width has been shown in two ways such as a narrow width in the neutral position of the steering wheel and a wide width at steering the steering wheel, however three or more kinds of the width may be indicated.

Third Modification

In the above embodiment, the width is the minimum in the neutral position of the steering wheel, the width becomes large by steering, and the tip of the control wheel indicator protrudes outside the vehicle width icon when the predetermined steering angle is exceeded; however, it may be configured vice versa. In other words, until the predetermined steering angle is exceeded, the vehicle width is maintained wide, and when the predetermined steering angle is exceeded, the vehicle width may be reduced so that the tip of the pointer of the control wheel indicator is protruded from the vehicle width indicator.

Fourth Modification

The display of the icon may be controlled by an indication pattern that simply indicates the tire being protruded from the lateral face of the vehicle body by the tire steering direction and the tire steering angle. In other words, a display control that does not combine the indication pattern according to the forward movement state, the rearward movement state, and the neutral state and the indication pattern according to the vehicle speed is also included contemplated herein. In addition, a combination of a tire-protruding notification display and the forward-rearward-neutral notification display, and a combination of the tire-protruding notification display and the vehicle speed notification display may also be employed.

Fifth Modification

The steering display device in the fifth modification notifies a protrusion of the control wheels (the tires) from a steering vehicle-width indication (rectangular frame) 151 without displaying the steering icon 150 of the forward-rearward movement information and the vehicle speed information. The steering display device in the fifth modification has the control wheels steered by steering of the steering operation member, is mounted on the work vehicle in which the inner tire and/or the outer tire of the control wheels is/are capable of protruding from the vehicle body by the steering, and visually displays the steering state of the control wheels. The steering icon 150 includes the display 15 and the image generation unit 16. The display 15 displays the vehicle width indicator 151 representing the vehicle width of the vehicle, and the control wheel indicator 152 representing the steering state of the control wheel as graphic information. The image generation unit 16 generates the control wheel indicator 152 and the vehicle width indicator 151 as graphic information in a manner such that the control wheel indicator 152 is rotated based on the steering angle of the control wheel and part of the control wheel indicator 152 protrudes from the vehicle width indicator 151 when the steering angle exceeds the predetermined value by corresponding to the steering angle in which the inner tire and/or the outer tire is protruded from the vehicle body.

Sixth Modification

The steering display device of the sixth modification is not a display device for notifying that the control wheels (tires) protrude from the steering vehicle-width indication (rectangular frame) 151, but is a display device for notifying steering information, forward-rearward movement information, and vehicle speed information by using a single steering icon. In other words, the steering display device of the sixth modification includes an input unit (an interface for receiving detection signals from the detectors 12 to 14 of FIG. 2) and the image generation unit 16. In the input unit, steering angle information of the control wheel, forward-rearward information of the vehicle, and the vehicle speed information of the vehicle are entered. The image generation unit 16 generates any one of the steering information indication pattern from the following three patterns as a steering icon 150 based on the entered information.

The first pattern of a steering information indication icon 150 is an indication pattern of the control wheel indicator 152 showing the steering state of the control wheel and a forward-rearward movement indication 152N, 152R respectively showing forward and rearward movement information of the vehicle (FIG. 6A to FIG. 6C).

The second pattern of the steering information indication icon 150 is an indication pattern of the control wheel indicator 152 showing the steering state of the control wheel and the vehicle speed information showing the vehicle speed information of the vehicle.

The third pattern of the steering information indication icon 150 is the indication pattern of the control wheel indicator 152 showing the steering state of the control wheel, the forward-rearward movement indication 152N, 152R showing forward-rearward movement information of the vehicle, and the vehicle speed information showing the vehicle speed information of the vehicle.

The display device of the sixth modification is also applicable in the embodiment in which the vehicle width indicator (rectangular frame) 151 is omitted. In the sixth modification, the vehicle width indicator (rectangular frame) 151 is not essential (the rectangular frame 151 is an optional configuration).

In addition, the above steering display device may be configured in a manner such that the steering icon 150 includes a front indicator and a rear indicator that respectively represent the forward direction and the rearward direction of the work vehicle. In other words, the image generation unit 16 generates the steering icon 150 based on the entered information from the input unit in a manner such that a front indicator 152FC is emphatically displayed when the work vehicle moves forward, a rear indicator 152RC is emphatically displayed when the work vehicle moves rearward, and the front indicator 152FC and the rear indicator 152RC are switched and displayed in the indication pattern in which the vehicle speed of the work vehicle is at low speed and in the indication pattern in which the vehicle speed of the work vehicle is at high speed.

In the above embodiments, a forklift has been described as an example; however, it is not limited to the forklift as long as it is a work vehicle that uses tires as control wheels and the control wheels being configured to protrude from the lateral face of the vehicle by the steering angle.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

BRIEF DESCRIPTION OF REFERENCE SYMBOLS

10: Steering display device
11: Controller
12: Forward-rearward movement detector
13: Vehicle speed detector
14: Steering angle detector
15: Display
15a: Vehicle speed indicator
15b: Steering information indicator
16: Image generation unit
18: Display panel
150: Steering icon
151: Rectangular frame (Vehicle width indicator)
151L: Left vehicle width line
151R: Right vehicle width line
152: Pointer (control wheel indicator)
152AX: Rotation axis
152N: Neutral pointer
152F: Forward movement pointer
152R: Rearward movement pointer
152S: Steering pointer
152FC: Pointer front area
152RC: Pointer rear area
152FT: Forward-movement-side tip
152RT: Rearward-movement-side tip

What is claimed is:

1. A steering display device of a work vehicle visually displaying a steering state of control wheels of the work vehicle, comprising:
    a display that is configured to display a vehicle width indicator representing a vehicle width of the work vehicle, and a control wheel indicator representing a state of steering of the control wheels as graphic information; and
    an image generation unit that is configured to rotate the control wheel indicator about a rotation axis of the control wheel indicator and is configured to widen or narrow the vehicle width indicator based on the steering of the control wheels,
    wherein the image generation unit is configured to generate the control wheel indicator and the vehicle width indicator in a manner such that when a steering angle of the control wheels exceeds a predetermined value, part of the control wheel indicator protrudes from the vehicle width indicator.

2. The steering display device according to claim 1, wherein
the image generation unit is configured to generate the control wheel indicator and the vehicle width indicator in a manner such that the control wheel indicator is located at an inside of the vehicle width indicator until a first steering angle in which the control wheels starts to protrude from a vehicle body and part of the control wheel indicator portion is located at an outside of the vehicle width indicator when the first steering angle is exceeded.

3. The steering display device according to claim 1, wherein
the rotation axis of the control wheel indicator is set at an inside of the vehicle width indicator, and a vehicle width of the vehicle width indicator when the control wheels have been steered is set to be wider than the vehicle width when the control wheels are in a neutral state.

4. The steering display device according to claim 1, wherein
the image generation unit is configured to generate the vehicle width indicator in a manner such that the vehicle width of the vehicle width indicator is varied based on the steering angle, and when the steering angle is large, the vehicle width is displayed larger than when the steering angle is small.

5. The steering display device according to claim 1, wherein
the image generation unit is configured to generate the vehicle width indicator and the control wheel indicator in a manner such that:
the control wheel indicator is displayed within the vehicle width of the vehicle width indicator until the steering angle reaches the first steering angle;
at least one of an outer tire and an inner tire protrudes from the vehicle width when reached a second steering angle; and
both of the outer tire and the inner tire protrude from the vehicle width when reached a third steering angle.

6. The steering display device according to claim 1, wherein
the image generation unit is configured to generate the vehicle width indicator in a manner such that a distance between the rotation axis and a vehicle width segment at the outer tire side is widened in a case where a distance between a pair of line segments facing each other in a vehicle width direction of the vehicle width indicator and the rotation axis of the control wheel indicator is widened.

7. The steering display device according to claim 1, wherein
the image generation unit is configured to generate the control wheel indicator based on forward-rearward movement information in a manner such that a vehicle forward-rearward movement information is displayed using the control wheel indicator.

8. The steering display device according to claim 1, wherein
the image generation unit is configured to generate the control wheel indicator based on a vehicle speed in a manner such that a vehicle speed information is displayed using the control wheel indicator.

* * * * *